US010724931B2

(12) United States Patent
Jackson

(10) Patent No.: US 10,724,931 B2
(45) Date of Patent: Jul. 28, 2020

(54) OUTER LOOP TORQUE CONTROL

(71) Applicant: ILLINOIS TOOL WORKS INC., Glenview, IL (US)

(72) Inventor: Christopher William Demos Jackson, Millis, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 120 days.

(21) Appl. No.: 16/160,151

(22) Filed: Oct. 15, 2018

(65) Prior Publication Data

US 2020/0116605 A1   Apr. 16, 2020

(51) Int. Cl.
*G01N 3/02* (2006.01)
*G05D 15/01* (2006.01)
*G05D 17/02* (2006.01)

(52) U.S. Cl.
CPC .............. *G01N 3/02* (2013.01); *G05D 15/01* (2013.01); *G05D 17/02* (2013.01)

(58) Field of Classification Search
None
See application file for complete search history.

(56) References Cited

U.S. PATENT DOCUMENTS

| 5,469,741 | A | * | 11/1995 | Scourtes | G01M 1/22 73/462 |
| 7,712,379 | B2 | * | 5/2010 | Abu-Farha | G01N 3/04 73/856 |
| 7,895,899 | B2 | | 3/2011 | Kelly et al. | |
| 7,938,015 | B2 | * | 5/2011 | Kaneda | G01N 3/02 73/788 |
| 8,966,992 | B2 | * | 3/2015 | Arzoumanidis | G01N 3/02 73/781 |
| 9,442,053 | B2 | * | 9/2016 | Melz | G01N 3/38 |
| 9,733,172 | B2 | * | 8/2017 | Kismarton | G01N 3/02 |
| 9,958,365 | B2 | * | 5/2018 | Heinlein | G01N 3/068 |
| 2013/0125661 | A1 | | 5/2013 | Arzoumanidis et al. | |
| 2018/0067027 | A1 | * | 3/2018 | Miller | G01N 3/20 |

FOREIGN PATENT DOCUMENTS

CN   203 643 255   6/2014

OTHER PUBLICATIONS

International Search report issued in PCT/US/2019/051380 dated Nov. 25, 2019.

* cited by examiner

*Primary Examiner* — Natalie Huls
*Assistant Examiner* — Jermaine L Jenkins
(74) *Attorney, Agent, or Firm* — McCarter & English, LLP

(57) ABSTRACT

The present disclosure relates to a materials testing device wherein an algorithmic approach is used to implement outer loop control software algorithm for control of a plurality of motors imparting different forces on a materials testing specimen. In particular, a torsion motor is controlled by an outer loop control software to control the rotational force applied to the materials testing sample.

12 Claims, 2 Drawing Sheets

OUTER LOOP TORQUE CONTROL

BACKGROUND OF THE DISCLOSURE

Field of the Disclosure

The present disclosure relates to an outer control loop which controls torque as an additional motion in a materials testing environment.

Description of the Prior Art

Universal test machines (Frames) typically contain sophisticated electronics to control them, including printed circuit hoards (PCB's), housing connections, processors, and other components. When packaging these electronics for use in such a machine, several factors must be taken into account; including cooling, shock protection, compliance with electromagnetic immunity & emissions (EMI) and other standards, all while minimizing the footprint taken up by the machine and optimizing ease of serviceability.

In the prior art of materials testing, it is known to use a single force, such as axial force, to impart a stress. The materials testing includes measuring the strain in response to the stress.

In the prior art, strain pacing may be used as part of the materials testing process. Strain pacing is an outer loop software algorithm that monitors the current data and alters the position rate to achieve a user defined tensile strain rate as determined from the tensile strain sensor. The pacing facility within the software allows the straining rate of the specimen to be controlled to a pre-defined level. It is intended for use with materials that show smooth, continuous deformation characteristics in the elastic region, such as metals and rigid or semi-rigid plastics. Many such materials are sensitive to the straining rate applied during the materials test and it is therefore desirable (and sometimes mandatory) to control, or at least limit, the strain rate. The actual maximum strain rate that can be controlled depends upon the characteristics of the specimen to be tested and the strain rate accuracy requirements. The lower the specimen stiffness and the more gradual the yield, the higher the strain rate that can be used.

Electromechanical testing machines normally run at a constant rate of crosshead displacement (i.e. crosshead speed) by using a position controlled servo-loop. The characteristics of the testing system and specimen are such that a constant rate of crosshead displacement may not result in a constant strain at the specimen, particularly in the yielding region. Hence the need for controlling the straining rate.

In the strain pacing mode, the software constantly alters the crosshead speed to achieve the demanded rate. The extensometer monitors the actual rate on the specimen, and the software computes the crosshead speed required to maintain the demanded rate as the test proceeds. The crosshead speed slows down as the material yields in order to maintain a constant straining rate due to the fact that most of the crosshead displacement is translated into permanent specimen deformation.

The strain pacing mode is intended for monotonic (unidirectional) tests only and is not suitable for controlling the straining rate during transient effects such as upper and lower yield, discontinuous yield phenomena or the use of multiple motors to impart forces in a plurality of axes or degrees of freedom, which may be orthogonal.

OBJECTS AND SUMMARY OF THE DISCLOSURE

It is therefore an object of the present disclosure to provide improvements in materials testing, including the ability to impart a plurality of forces through multiple axes or degrees of freedom on a test sample, and to provide the appropriate feedback to allow this functionality.

This object and others is attained by providing a materials testing device with a plurality of motors or drivers, thereby being able to impart a plurality of forces in a plurality axes or degrees of freedom, which may be orthogonal (such as, but not limited to, the axial and rotational axes in a cylindrical coordinate system). An outer loop is used to control torque in order to impart a torsional or rotational force to the materials testing sample.

Controlling the rotational motor or driver through an outer loop typically does not require additional hardware. The axis control is accomplished through software only, using the torque cell as a feedback device, and providing system expansion capabilities to add controlled axes to hardware initially designed for single axis machines.

BRIEF DESCRIPTION OF THE DRAWINGS

Further objects and advantages of the disclosure will become apparent from the following description and from the accompanying drawings, wherein.

DETAILED DESCRIPTION OF THE PREFERRED EMBODIMENTS

Figure 1:
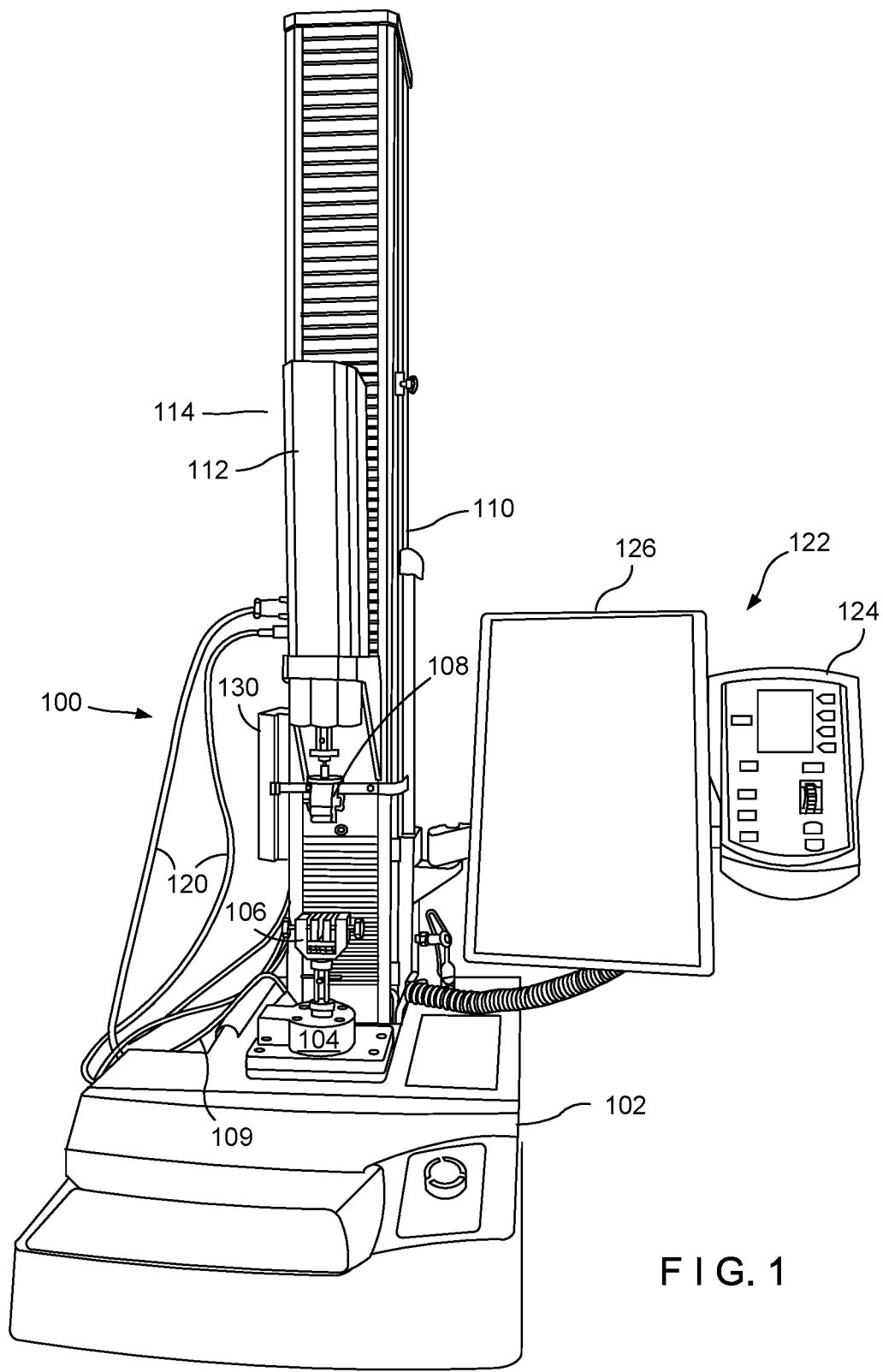
FIG. 1 is a perspective view of an embodiment of the materials testing device of the present disclosure.

Referring now to the drawings in detail, one sees that FIG. 1 is a perspective view of materials testing device or mechanical test frame 100. The test frame 100 includes a base 102 to which bi-axial load cell 104 is attached. Lower grip 106 is attached to bi-axial load cell 104. Bi-axial load cell 104 measures the load (typically axial load and rotational torque) applied to a materials testing sample (not shown) which is engaged between lower and upper grips 106, 108, and communicates the information or raw data regarding axial load and rotational torque via cables 109 to control unit 122 which includes manual input unit 124 and screen 126.

Rail 110 extends upwardly from base 102 and supports upper assembly 112 which includes crosshead 113 and engages upper grip 108. Upper assembly 112 includes drive assembly 114 for driving the crosshead 113 thereby imparting vertical forces (i.e., linear or axial forces, or stress, with respect to the materials testing sample (engaged between lower and upper grips 106, 108). Additionally, a change in axial translation of crosshead 113 along rail 110 while imparting axial force on the materials testing sample can be interpreted as the change in distance or length (Δy) in the strain calculation. The information or raw data regarding the vertical or axial position of crosshead 113 (and therefore the vertical position of upper grip 108) is provided by an encoder that is mounted on a motor installed in base 102 and communicates with control unit 122 (which includes manual input unit 124 and screen 126). The information on the rotational position of upper grip 108 is provided by an encoder mounted on the torsion motor, housed in upper assembly 112 and transmitted via cables 120 to control unit 122.

Likewise, drive assembly 114 includes a torsion motor or driver for imparting torsion upon the materials testing sample via upper grip 108. The torsion motor is controlled by torsion motor controller 130 mounted upon the rail 110 of test frame 100.

The torsion add-on system, including torsion motor controller 130, is an electromechanical assembly, which when added to materials testing device or test frame 100, provides torsional capabilities to the axially moving crosshead 113. A torsion add-on (TAO) system can be added to the single or dual column frames. The user of the materials testing equipment can perform rotations of the test specimen before, during or after applying axial load. Rotations are monitored and controlled using an incremental encoder mounted to the torsion motor within upper assembly 112. Torque and axial load values are recorded and controlled using biaxial load cell 104 that monitors the forces applied to the test specimens.

The torsion add-on system and the mechanical test frame 100 are controlled by software. The user, working through the software interface, such as manual input unit 124, enters the test parameters to define how the materials testing device 100 will run a test. A motion of materials testing device 100 is typically accomplished in closed loop control, meaning that the hardware and firmware in the materials testing device 100 are dedicated to controlling the axial motion of the crosshead 113.

The system is able to rotate a materials testing sample (engaged between lower and upper grips 106, 108) under test until a desired torque value is reached. At this point, the system can enter into an outer loop torque hold mode where the rotational speed of the torsion motor which is controlled by an external controller is updated at regular intervals to maintain a zero torque rate (or a positive or negative torque rate, typically pre-selected) on the materials testing sample under test. There is a gain factor multiplier built into the algorithm which allows materials with different stiffnesses to be held at a constant and desired torque.

Figure 2:
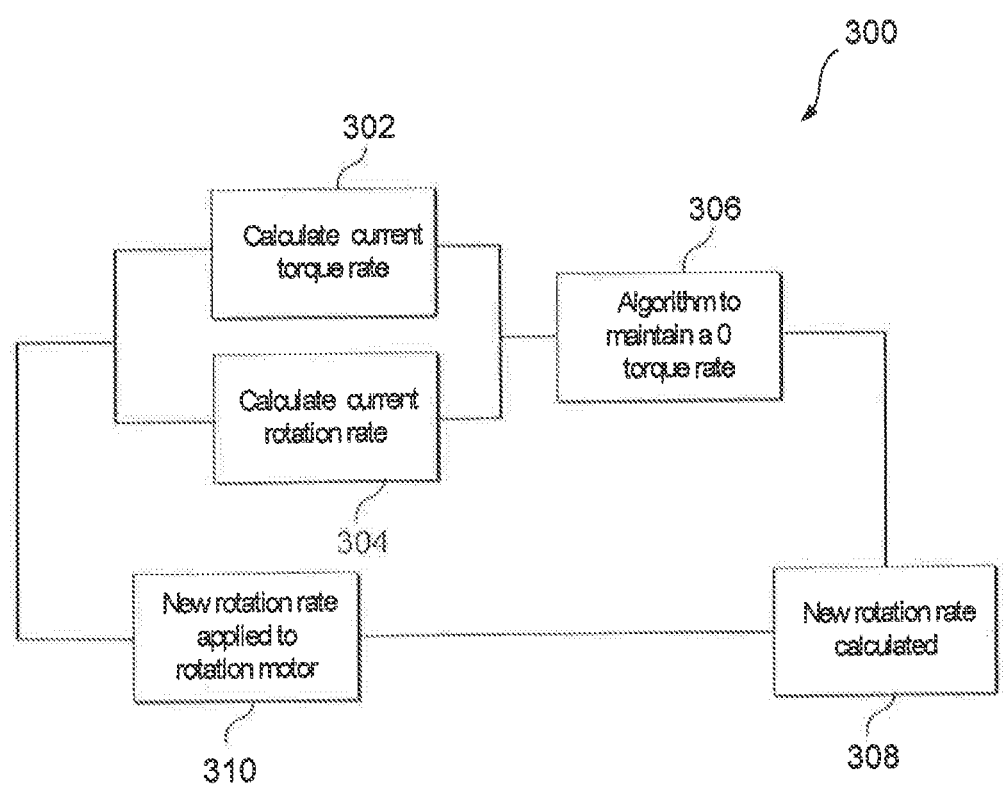
FIG. 2 is a schematic of the outer loop used for control of the torsional or other forces applied to the materials testing specimen by the apparatus of FIG. 1.

The algorithmic approach is illustrated in more detail by the flowchart 300 of FIG. 2. The current torque rate is calculated in step 302 while the current rotational rate is calculated in step 304. The output from steps 302, 304 is used by step 306 in an algorithm to maintain a zero torque rate (or a positive or negative torque rate, typically pre-selected). The output from step 306 is used to calculate a new rotational rate in step 308. The output from step 308 is used to apply a new rotational rate to the rotation motor in step 310. The output from step 310 is received by steps 302, 304, thereby completing the closed loop control system.

This approach can be applied to use two or more motors to apply forces to a materials testing sample.

Thus the several aforementioned objects and advantages are most effectively attained. Although preferred embodiments of the invention have been disclosed and described in detail herein, it should be understood that this invention is in no sense limited thereby.

What is claimed is:

1. A materials testing device including:
    a first grip and a second grip, for holding a materials testing sample therebetween;
    a first driver for imparting an axial force on the materials testing sample through at least one of said first and second grips;
    a second driver for imparting a rotational force on the materials testing sample through at least one of the first and second grips;
    a load cell attached to the first grip to measure axial and rotational stress on the materials testing sample;
    a rail along which the second grip is driven by the first driver, the displacement of the second grip being measured to calculate axial strain on the materials testing sample; and
    a feedback system for controlling the second driver.

2. The materials testing device of claim 1 wherein the first grip is a lower grip and the second grip is an upper grip positioned over the first grip.

3. The materials testing device of claim 1 wherein the axial force is orthogonal to the rotational force in a cylindrical coordinate system.

4. The materials testing device of claim 1 wherein the second driver includes an encoder to measure rotational strain on the materials testing sample.

5. The materials testing device of claim 4 wherein the feedback system uses a current torque rate and a current rotation rate to calculate rotational forces required to maintain a zero torque rate on the materials testing sample.

6. The materials testing device of claim 5 wherein the calculated rotational forces required to maintain a zero torque rate on the materials testing sample are used to calculate a new rotational rate, the calculated new rotational rate being communicated to the second driver.

7. A method for material testing, including the steps of:
    providing a first grip and a second grip, for holding a materials testing sample therebetween;
    providing a first driver for imparting an axial force on the materials testing sample through at least one of said first and second grips;
    providing a second driver for imparting a rotational force on the materials testing sample through at least one of the first and second grips;
    providing a load cell attached to the lower grip to measure axial and rotational stress on the sample;
    providing a rail along which the second grip is driven by the first driver, the displacement of the second grip being measured to calculate axial strain on the materials testing sample; and
    providing a feedback system for controlling the second driver.

8. The method of claim 7 wherein the first grip is a lower grip and the second grip is an upper grip positioned over the first grip.

9. The method of claim 7 wherein the axial force is orthogonal to the rotational force in a cylindrical coordinate system.

10. The method of claim 7 wherein the second driver includes an encoder to measure rotational strain on the materials testing sample.

11. The method of claim 10 wherein the feedback system performs the step of using a current torque rate and a current rotation rate to calculate rotational forces required to maintain a zero torque rate on the materials testing sample.

12. The method of claim 11 wherein the feedback system performs the steps of the using the calculated rotational forces required to maintain a zero torque rate on the materials testing sample to calculate a new rotational rate, and communicating the calculated new rotational rate to the second driver.

* * * * *